(12) United States Patent
Booker

(10) Patent No.: US 11,103,047 B2
(45) Date of Patent: Aug. 31, 2021

(54) DENTAL HYGIENE DEVICE

(71) Applicant: BRUSHTIME ENTERPRISES, LLC, Owings Mills, MD (US)

(72) Inventor: Winifred J. Booker, Owings Mills, MD (US)

(73) Assignee: BRUSHTIME ENTERPRISES, LLC, Owings Mills, MD (US)

( * ) Notice: Subject to any disclaimer, the term of this patent is extended or adjusted under 35 U.S.C. 154(b) by 338 days.

(21) Appl. No.: 15/901,417

(22) Filed: Feb. 21, 2018

(65) Prior Publication Data

US 2018/0235348 A1    Aug. 23, 2018

Related U.S. Application Data

(60) Provisional application No. 62/461,885, filed on Feb. 22, 2017.

(51) Int. Cl.
| | |
|---|---|
| *A45D 27/22* | (2006.01) |
| *A45D 40/22* | (2006.01) |
| *G09B 19/00* | (2006.01) |
| *A45D 34/06* | (2006.01) |
| *A45D 40/00* | (2006.01) |

(Continued)

(52) U.S. Cl.
CPC ............ *A45D 40/22* (2013.01); *A45C 11/008* (2013.01); *A45D 34/06* (2013.01); *A45D 40/00* (2013.01);
(Continued)

(58) Field of Classification Search
CPC ........ A45D 40/22; A45D 40/18; A45D 40/00; A45D 2040/0012; A45D 2034/007;
(Continued)

(56) References Cited

U.S. PATENT DOCUMENTS 1,991,867 A * 2/1935 Riciputi ............... A45C 11/008
132/313
1,999,328 A * 4/1935 Lessard ................ A45D 33/22
132/315

(Continued)

FOREIGN PATENT DOCUMENTS

| GB | 2336995 | 11/1999 |
|---|---|---|
| KR | 20140025219 | 3/2014 |
| WO | WO 2004103850 | 12/2004 |

OTHER PUBLICATIONS

The Maryland Children's Oral Health Institute, et al., MYCOHI Lessons in a lunch box 2008, Jul. 20, 2008, https://www.youtube.com/watch? Time_continue=38&v=q+sZ65UHvTQ Jul. 20, 2008.

(Continued)

*Primary Examiner* — Rachel R Steitz
(74) *Attorney, Agent, or Firm* — Haynes and Boone, LLP

(57) ABSTRACT

A dental hygiene device including a case and a closure. The case includes first and second half-shells hingedly coupled to one another and actuable between open and closed configurations. The closure engages the case when the case is in the closed configuration to thereby secure the case in the closed configuration. The first half-shell may be divided into first and second compartments by a first divider wall. The first divider wall may include first and second notches formed therein and configured to accommodate a toothbrush and a toothpaste container, respectively. The second half-shell may be divided into third and fourth compartments by a second divider wall. When the case is in the closed configuration, the first compartment may be contiguous with at least part of the third compartment, and the second compartment may be contiguous with at least part of the third and fourth compartments.

26 Claims, 11 Drawing Sheets

(51) Int. Cl.
    *A45D 40/18* (2006.01)
    *A45D 42/00* (2006.01)
    *A45C 11/00* (2006.01)
    *A46B 17/04* (2006.01)
    *A61C 15/04* (2006.01)
    *A46B 15/00* (2006.01)
    *A45D 34/00* (2006.01)

(52) U.S. Cl.
    CPC ............ *A45D 40/18* (2013.01); *A45D 42/00* (2013.01); *G09B 19/0084* (2013.01); *A45D 2034/007* (2013.01); *A45D 2040/0012* (2013.01); *A46B 15/0061* (2013.01); *A46B 17/04* (2013.01); *A46B 2200/1066* (2013.01); *A61C 15/043* (2013.01)

(58) Field of Classification Search
    CPC ........ A45D 42/00; A45D 42/24; A45D 44/18; A45D 34/06; A45D 2200/05; A45D 2200/25; A46B 17/04; A46B 15/0061
    USPC .......... 220/4.22, 4.23, 4.01, 4.03, 503, 507; 206/457, 368, 369, 581
    See application file for complete search history.

(56) References Cited

U.S. PATENT DOCUMENTS

| | | | |
|---|---|---|---|
| 3,949,767 A | 4/1976 | Rose | |
| D307,196 S * | 4/1990 | McClure | D28/78 |
| 5,095,924 A * | 3/1992 | Stanfield | A45D 44/18 132/310 |
| 5,253,773 A | 10/1993 | Choma et al. | |
| 5,921,383 A | 7/1999 | Shefler et al. | |
| 6,253,773 B1 * | 7/2001 | Ingemann | A45D 44/18 132/308 |
| D474,034 S | 5/2003 | Currach et al. | |
| D666,459 S * | 9/2012 | Kolano | D7/628 |
| 2006/0207626 A1 * | 9/2006 | Harangozo | A45D 44/18 132/309 |

OTHER PUBLICATIONS

Improved Carrot Case Design Compliments Oral Health Program (News Article; MCOHI) Oct. 4, 2017.
International Search Report and Written Opinion issued by the International Search Authority in International Application No. PCT/US18/18993, dated May 15, 2018, 12 pages.
Supplementary European Search Report issued by the European Patent Office in European Patent Application No. 18757508, dated Oct. 6, 2020, 7 pages.
Anonymous, "Presenting the lessons in a lunch box" Mar. 19, 2015 Retrieved from the Internet: URL:http://mycohi.org/pdfs/Play-by-Play_for_Lessons_In_A_Lunch_Box.pdf (retrieved Sep. 24, 2020).
Anonymous, "Lessons in a lunch box—Dental care in a carrot case" Jan. 17, 2010 Retrieved from the Internet:URL: https://www.youtube.com/watch?v=ACN6 1 Pk7nE0 (retrieved Sep. 24, 2020).

* cited by examiner

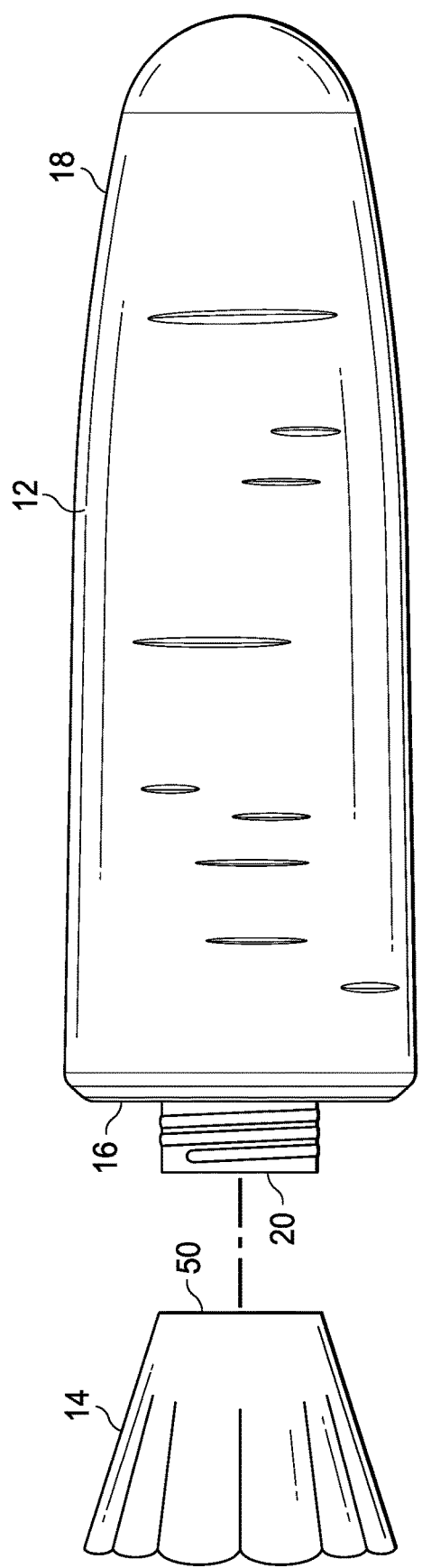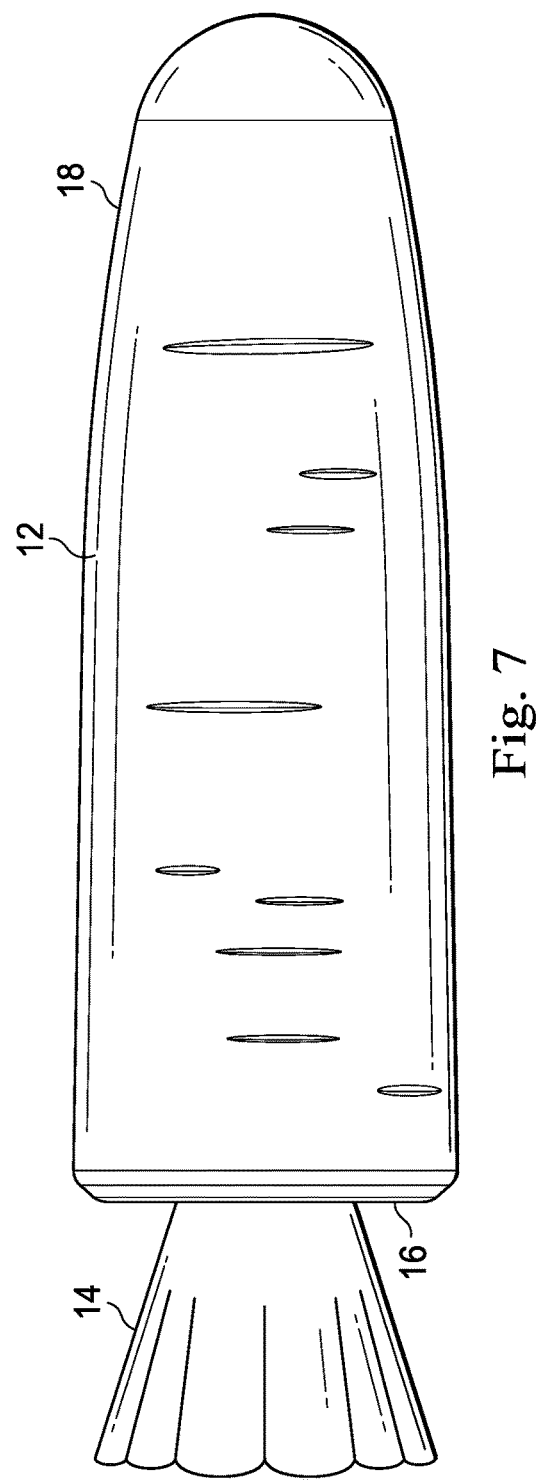

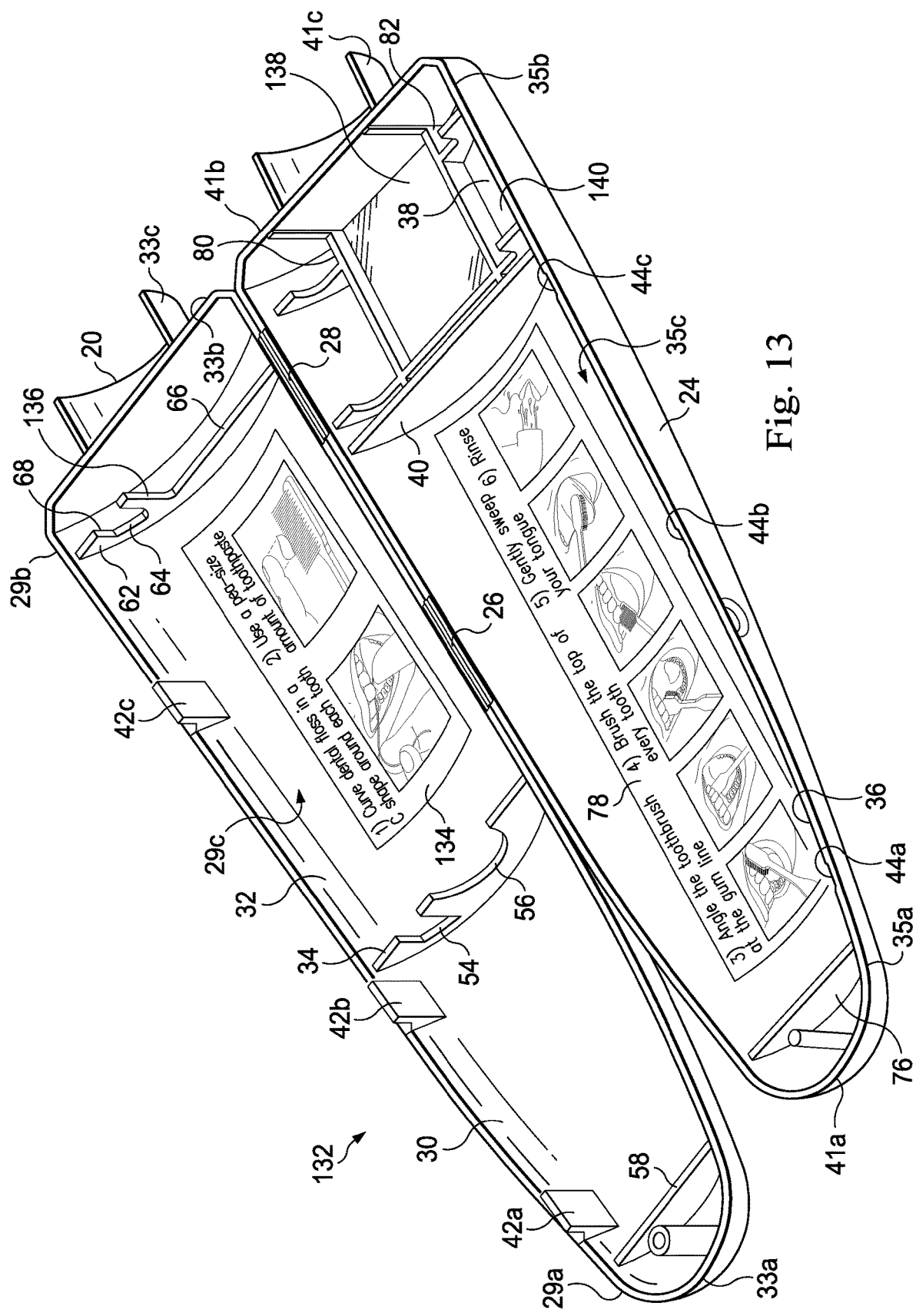

DENTAL HYGIENE DEVICE

CROSS-REFERENCE TO RELATED APPLICATION

This application claims the benefit of the filing date of, and priority to, U.S. patent application Ser. No. 62/461,885, filed Feb. 22, 2017, the entire disclosure of which is hereby incorporated herein by reference.

TECHNICAL FIELD

The present disclosure relates in general to dental hygiene and, more particularly, to a dental hygiene device including a case and a closure.

BRIEF DESCRIPTION OF THE DRAWINGS

FIG. 6 is an elevational view of the case and closure of FIGS. 1-5, with the closure being disengaged from the case, according to an embodiment.

FIG. 7 is an elevational view of the case and closure of FIGS. 1-6 with the closure engaging the case, according to an embodiment.

FIG. 13 is a perspective view of another case actuated to an open configuration, the another case being configured to form part of a dental hygiene device such as, for example, the dental hygiene device of FIGS. 1-12, according to an embodiment.

DETAILED DESCRIPTION

Figure 1:
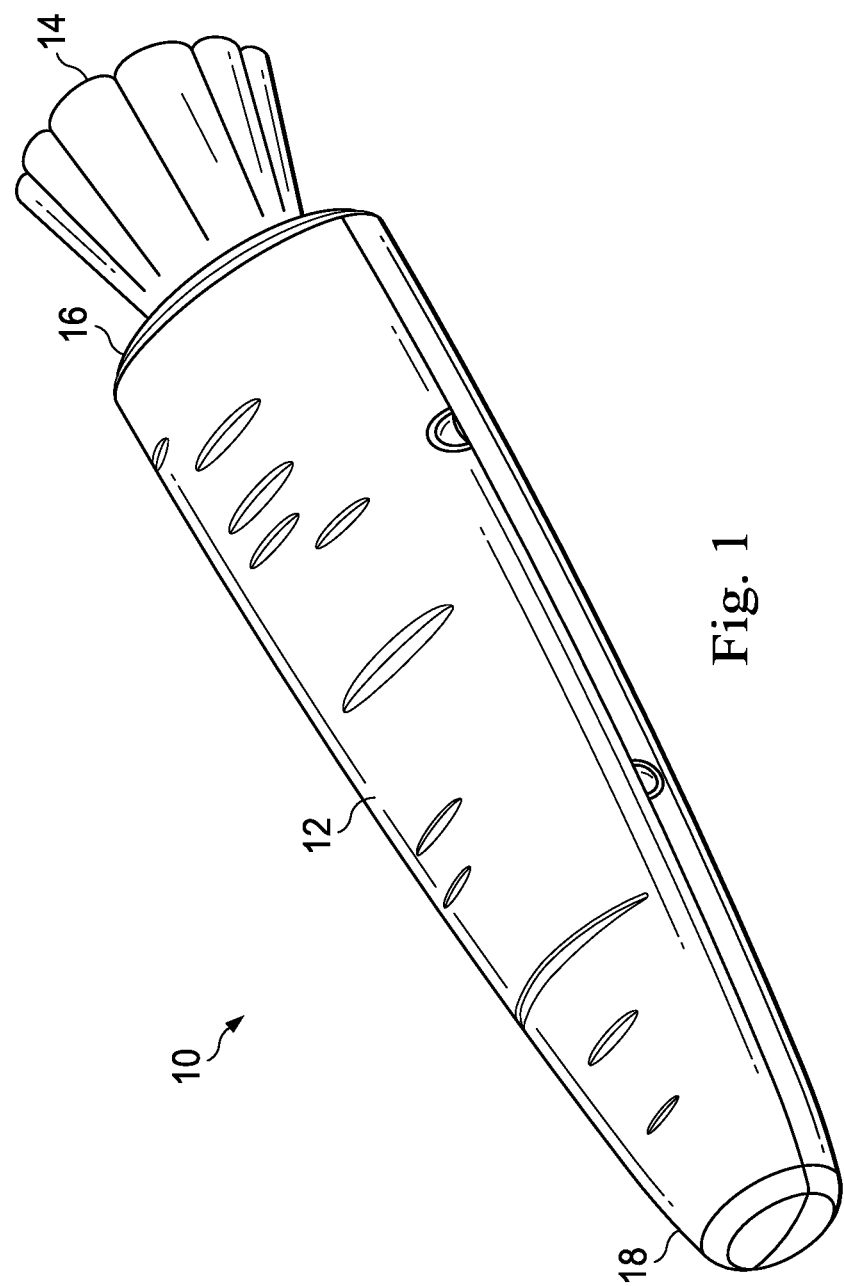
FIG. 1 is a perspective view of a dental hygiene device including a case and a closure, according to an embodiment.

In an embodiment, as illustrated in FIG. 1, a dental hygiene device is generally referred to by the reference numeral 10. The dental hygiene device 10 includes a case 12 and a closure 14. In some embodiments, the case 12 is shaped to resemble the storage root of a carrot plant. In some embodiments, the closure 14 is shaped to resemble the stem of the carrot plant. Although described herein as resembling the storage root and stem of a carrot plant, the case 12 and closure 14 of the dental hygiene device 10 may instead be shaped to resemble another vegetable, a fruit, a children's character, or the like.

Figure 2:
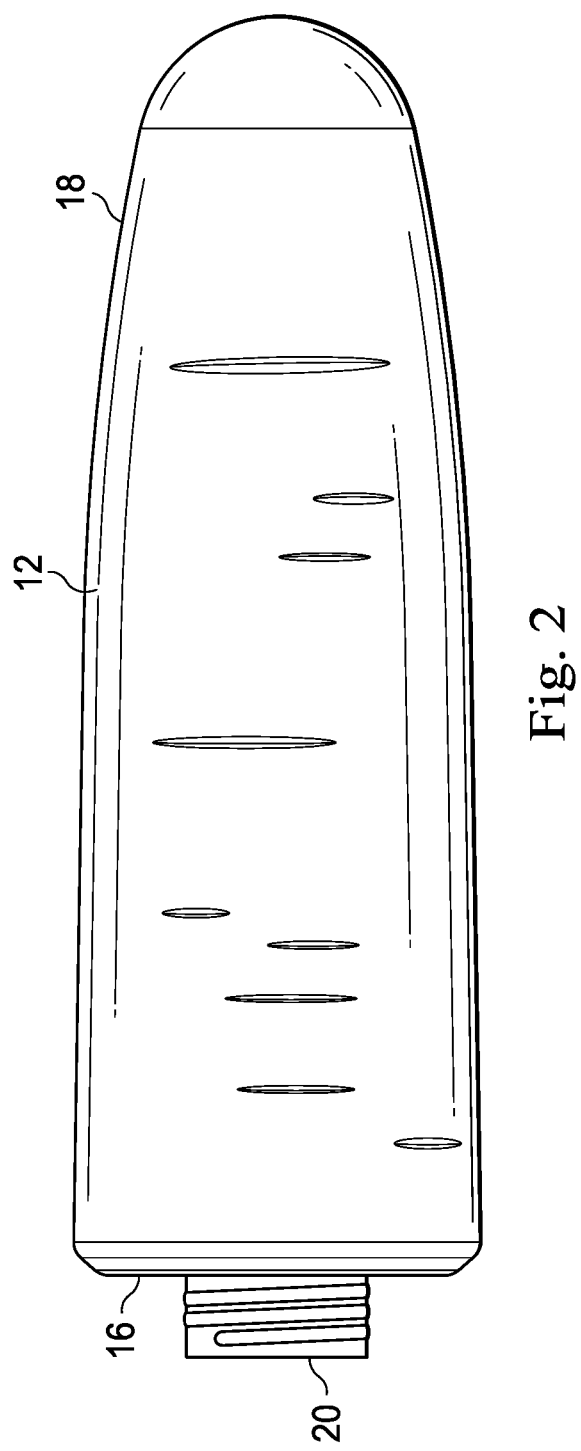
FIG. 2 is an elevational view of the case of FIG. 1 actuated to a closed configuration, according to an embodiment.
Figure 3:
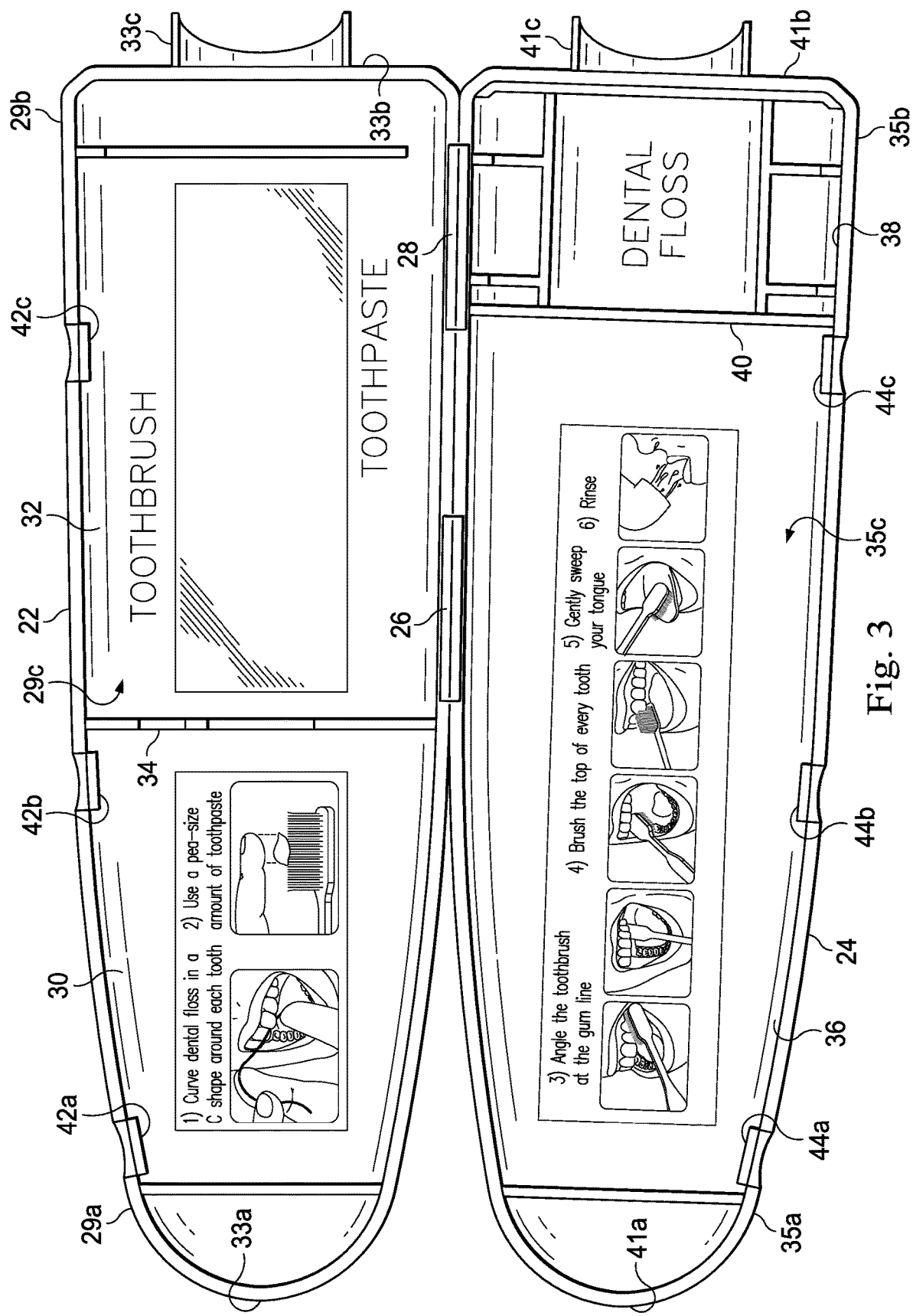
FIG. 3 is a top plan view of the case of FIGS. 1 and 2 actuated to an open configuration and including first and second half-shells, according to an embodiment.

In an embodiment, as illustrated in FIGS. 2 and 3 with continuing reference to FIG. 1, at opposing end portions thereof, the case 12 includes a shoulder 16 and a tip 18. An external connection 20 extends from the shoulder 16 opposite the tip 18. In some embodiments, the external connection 20 is threaded. The case 12 is bisected so as to include opposing half-shells 22 and 24 hingedly coupled to one another via, for example, hinges 26 and 28. The half-shell 22 defines opposing end portions 29a and 29b and an internal concavity 29c. The half-shell 22 includes a divider wall 34. The internal concavity 29c of the half-shell 22 is divided into compartments 30 and 32 by the divider wall 34. In some embodiments, the divider wall 34 provides structural integrity to the half-shell 22. The half-shell 22 further includes a tip part 33a located at the end portion 29a, which tip part 33a is a bisected part of the tip 18. The compartment 30 extends between the tip part 33a and the divider wall 34. The half-shell 22 further includes an end wall 33b located at the end portion 29b. The compartment 32 extends between the end wall 33b and the divider wall 34. Similarly, the half-shell 24 defines opposing end portions 35a and 35b and an internal concavity 35c. The half-shell 24 includes a divider wall 40. The internal concavity 35c of the half-shell 24 is divided into compartments 36 and 38 by the divider wall 40. In some embodiments, the divider wall 40 provides structural integrity to the half-shell 24. The half-shell 24 further includes a tip part 41a located at the end portion 35a, which tip part 41a is another bisected part of the tip 18. The compartment 36 extends between the tip part 41a and the divider wall 40. The half-shell 24 further includes an end wall 41b located at the end portion 35b. The compartment 38 extends between the end wall 41b and the divider wall 40. The external connection 20 is also bisected so that respective portions thereof extend from the half-shells 22 and 24. Accordingly, the half-shell 22 further includes an external connection part 33c extending from the end wall 33b in a direction opposite the tip part 33a, which external connection part 33c is a bisected part of the external connection 20. Similarly, the half-shell 24 further includes an external connection part 41c extending from the end wall 41b in a direction opposite the tip part 41a, which external connection part 41c is another bisected part of the external connection 20.

The case 12 is actuable, via the hinges 26 and 28, between an open configuration (shown in FIG. 3) and a closed configuration (shown in FIG. 2). The case 12 is adapted to be held in the closed configuration by, for example, male connectors 42a-c and female connectors 44a-c. The male connectors 42a-c extend from the half-shell 22. The female connectors 44a-c are formed in the half-shell 24. The male connectors 42a-c are adapted to engage the female connectors 44a-c, respectively, when the case 12 is in the closed configuration. In some embodiments, the male connectors 42a-c are omitted and replaced with female connectors substantially identical to the female connectors 44a-c. In some embodiments, the female connectors 44a-c are omitted and replaced with male connectors substantially identical to the male connectors 42a-c. In some embodiments, the male connectors 42a-c are omitted and replaced with female connectors substantially identical to the female connectors 44a-c, and the female connectors 44a-c are omitted and replaced with male connectors substantially identical to the male connectors 42a-c.

Figure 4:
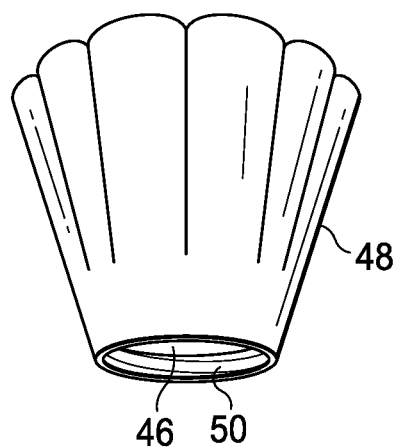
FIG. 4 is a perspective view of the closure of FIG. 1, the closure including a bottom and an outer wall according to an embodiment.
Figure 5:
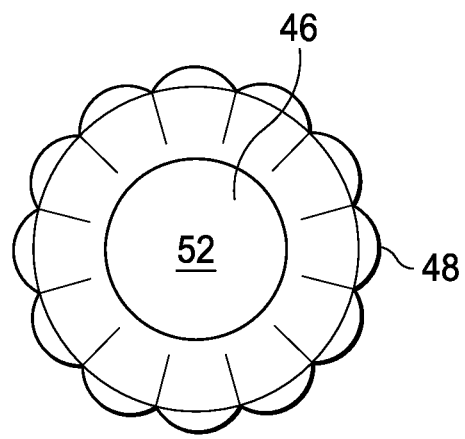
FIG. 5 is a top plan view of the closure of FIG. 4, according to an embodiment.

In an embodiment, as illustrated in FIGS. 4 and 5 with continuing reference to FIG. 1, the closure 14 is generally cup-shaped and includes a bottom 46, an outer wall 48, and an internal connection 50. The outer wall 48 circumscribes the bottom 46. As a result, the bottom 46 and the outer wall 48 together define an empty space 52 capable of receiving a liquid such as, for example, water, mouth-wash, another oral hygiene product, or the like. The internal connection 50 extends adjacent the bottom 46 and opposite the empty space 52. In some embodiments, the internal connection 50 is threaded. The internal connection 50 of the closure 14 is adapted to engage (e.g., threadably) the external connection 20 of the case 12, including each of the external connection parts 33c and 41c of the half-shells 22 and 24, respectively, when the case 12 is in the closed configuration, as shown in FIGS. 6 and 7. Such engagement between the internal connection 50 and the external connection 20 secures the case 12 in the closed configuration.

Figure 8:
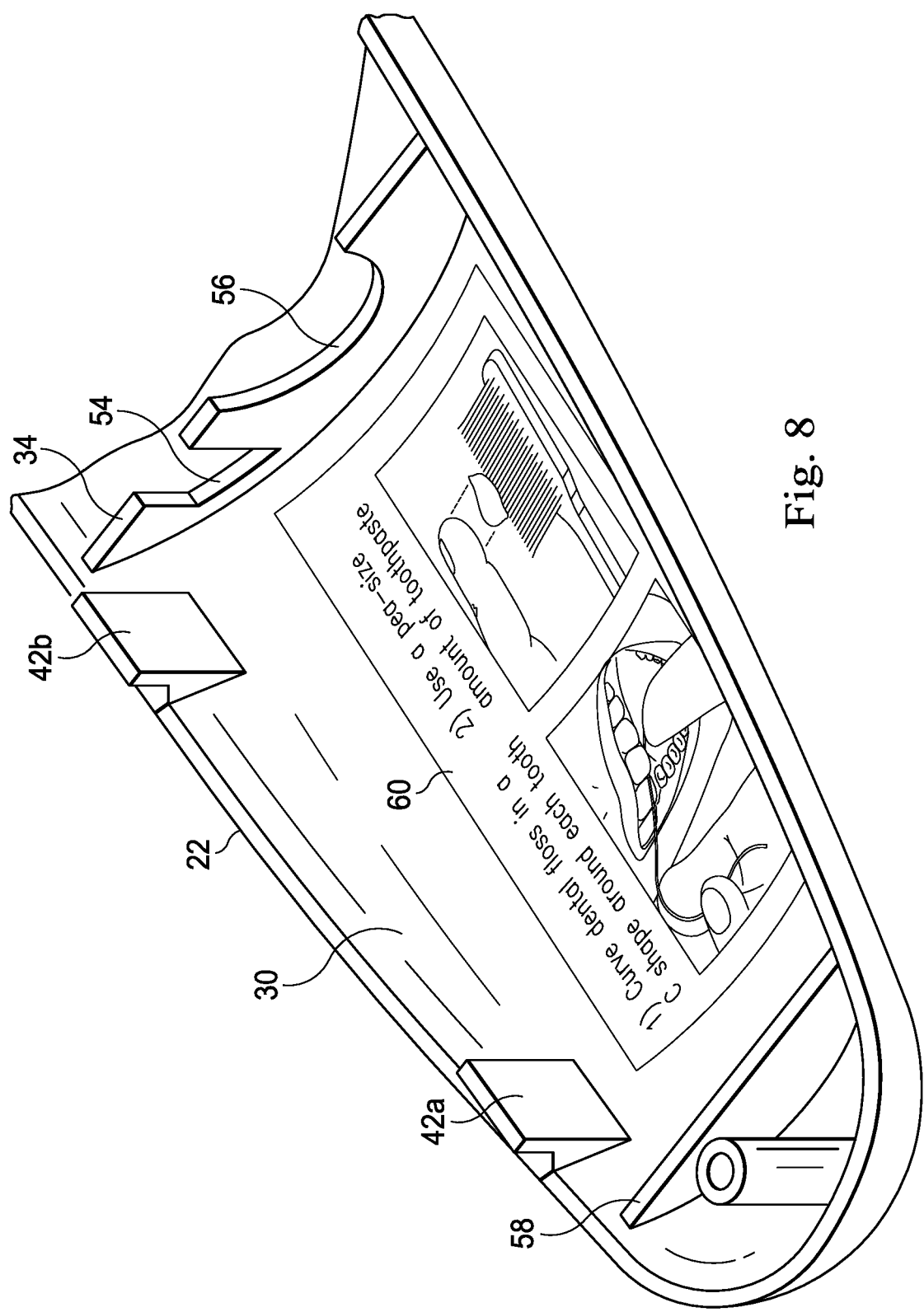
FIG. 8 is an elevational view of a first compartment of the first half-shell of FIG. 3, according to an embodiment.

In an embodiment, as illustrated in FIG. 8 with continuing reference to FIG. 3, the compartment 30 of the half-shell 22 extends adjacent, and interior to, the end portion of the case 12 that includes the tip 18. As a result, when the case 12 is in the closed configuration, the compartment 30 is contiguous with at least part of the compartment 36 of the half-shell 24. In some embodiments, the male connectors 42a and 42b extend within, or adjacent, the compartment 30. Moreover, the compartment 30 extends adjacent the divider wall 34 and opposite the compartment 32. The divider wall 34 includes a pair of notches 54 and 56. In some embodiments, the notch 54 has a rectangular shape, thus forming a generally U-shaped edge in the divider wall 34. In some embodiments, the notch 56 has a semi-circular shape, thus forming an arc-shaped edge in the divider wall 34. In some embodiments, the notch 54 has a rectangular shape and the notch 56 has a semi-circular shape.

An end wall 58 also extends within the compartment 30. In some embodiments, the end wall 58 is spaced in a substantially parallel relation with the divider wall 34. In some embodiments, the end wall 58 provides additional structural integrity to the half-shell 22. An instructional label 60 is adhered to the half-shell 22 between the end wall 58 and the divider wall 34. In some embodiments, the instructional label 60 includes instructions (e.g., text and/or graphics) for flossing between teeth and/or applying toothpaste to a toothbrush. For example, the instructional label 60 may include instructions illustrating the following steps: 1) curve dental floss in a C-shape around each tooth; and 2) use a pea-size amount of toothpaste.

Figure 9:
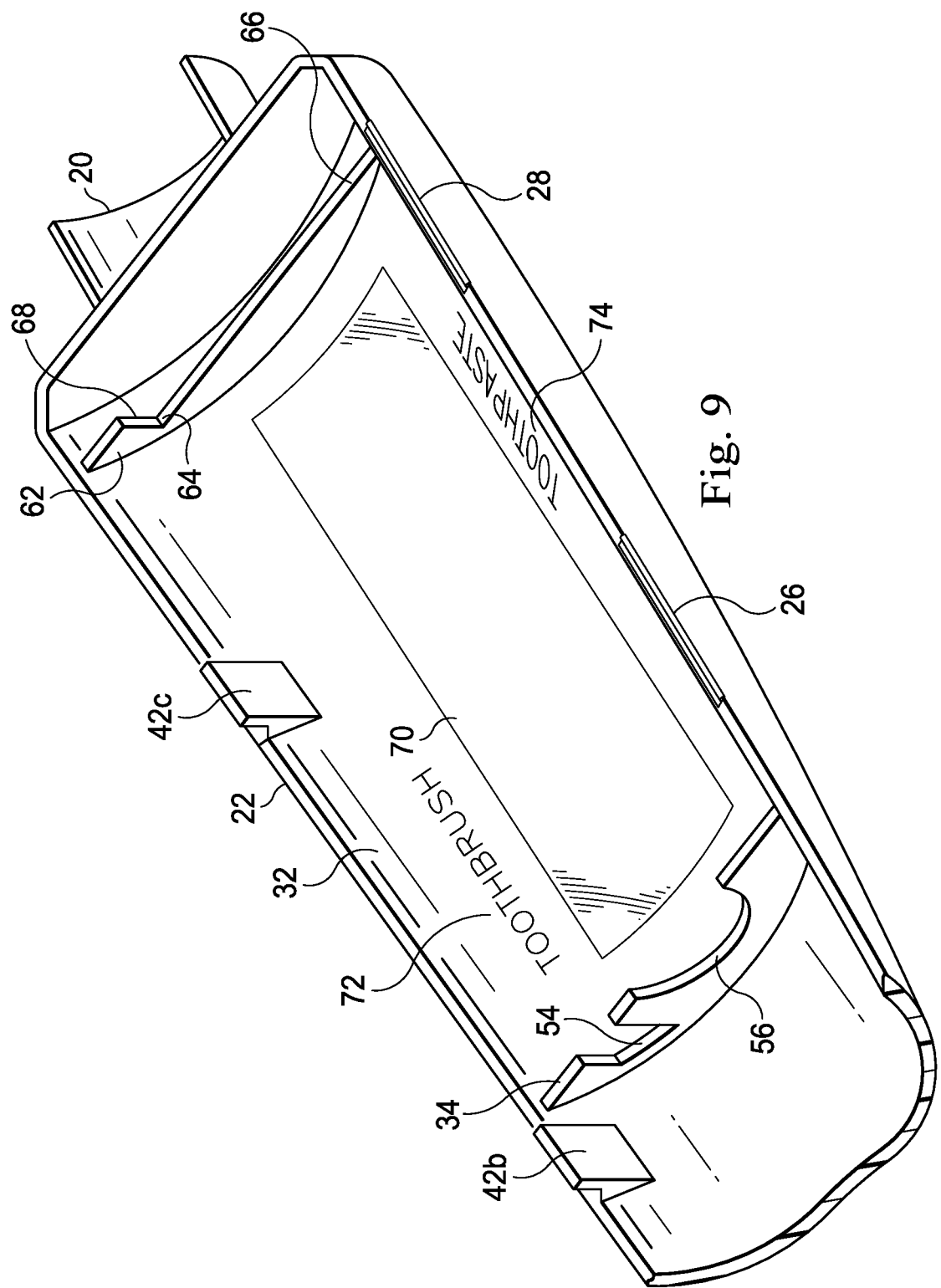
FIG. 9 is an elevational view of a second compartment of the first half-shell of FIG. 3, according to an embodiment.

In an embodiment, as illustrated in FIG. 9 with continuing reference to FIG. 3, the compartment 32 of the half-shell 22 extends adjacent, and interior to, the end portion of the case 12 that includes the shoulder 16. As a result, when the case 12 is in the closed configuration, the compartment 32 is contiguous with at least respective portions of the compartments 36 and 38 of the half-shell 24. In some embodiments, the male connector 42c extends within, or adjacent, the compartment 32. Moreover, the compartment 32 extends adjacent the divider wall 34 and opposite the compartment 30.

An end wall 62 also extends within the compartment 32. In some embodiments, the end wall 62 is spaced in a substantially parallel relation with the divider wall 34. In some embodiments, the end wall 62 provides additional structural integrity to the half-shell 22. The end wall 62 includes a step 64 having a rectangular shape. The step 64 forms a bottom edge 66 and a side edge 68 in the end wall 62. A reflective strip 70 is adhered to the half-shell 22 between the end wall 62 and the divider wall 34. In some embodiments, the reflective strip 70 is made of stainless steel. However, the reflective strip 70 can be made of any suitable material such as, for example Mylar. In some embodiments, the reflective strip 70 is about 3" in length. In some embodiments, the reflective strip 70 is about ¾" in width. In some embodiments, the reflective strip 70 is about 3" in length and about ¾" in width.

Textual designations 72 and 74 are molded into the interior of the half-shell 22. The textual designation 72 extends adjacent, and between, the notch 54 and the side edge 68. In some embodiments, the textual designation 72 extends adjacent the reflective strip 70. The textual designation 74 extends adjacent, and between, the notch 56 and the bottom edge 66. In some embodiments, the textual designation 74 extends adjacent the reflective strip 70, opposite the textual designation 72. In some embodiments, the textual designation 72 reads "TOOTHBRUSH" and the textual designation 74 reads "TOOTHPASTE."

Figure 10:
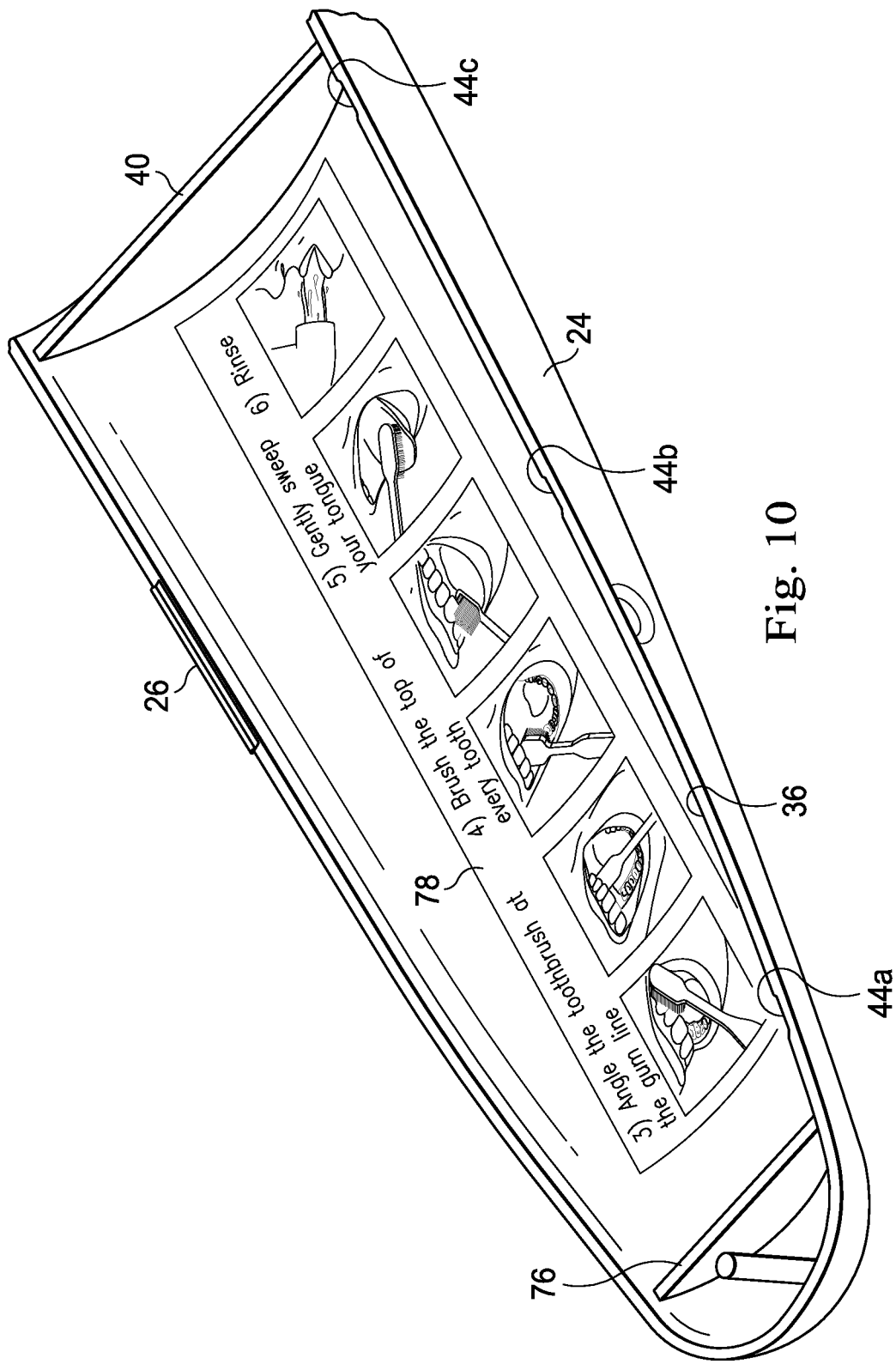
FIG. 10 is an elevational view of a first compartment of the second half-shell of FIG. 3, according to an embodiment.

In an embodiment, as illustrated in FIG. 10 with continuing reference to FIG. 3, the compartment 36 of the half-shell 24 extends adjacent, and interior to, the end portion of the case 12 that includes the tip 18. As a result, when the case 12 is in the closed configuration, the compartment 36 is contiguous with at least respective portions of the compartments 30 and 32 of the half-shell 22. In some embodiments, the female connectors 44a-c extend within, or adjacent, the compartment 36. Moreover, the compartment 36 extends adjacent the divider wall 40 and opposite the compartment 38.

An end wall 76 also extends within the compartment 36. In some embodiments, the end wall 76 is spaced in a substantially parallel relation with the divider wall 40. In some embodiments, the end wall 76 provides additional structural integrity to the half-shell 24. In some embodiments, when the case 12 is in the closed configuration, the end wall 76 is substantially co-planar with the end wall 58. An instructional label 78 is adhered to the half-shell 24 between the end wall 76 and the divider wall 40. In some embodiments, the instructional label 78 includes instructions (e.g., text and/or graphics) for brushing teeth. For example, the instructional label 78 may include instructions illustrating the following steps: 3) angle toothbrush at the gumline; 4) brush the top of every tooth; 5) gently sweep your tongue; and 6) rinse.

Figure 11:
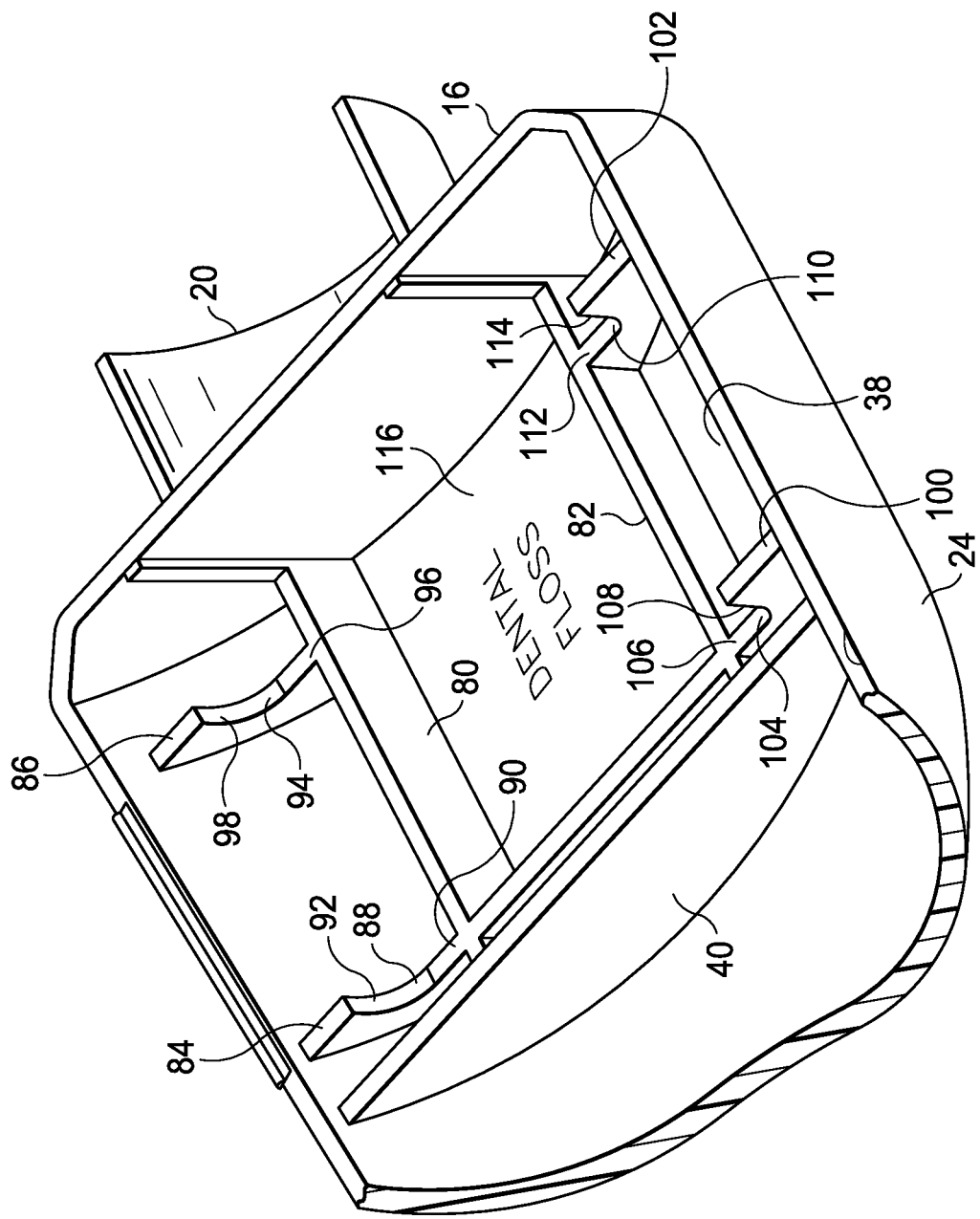
FIG. 11 is an elevational view of a second compartment of the second half-shell of FIG. 3, according to an embodiment.

In an embodiment, as illustrated in FIG. 11 with continuing reference to FIG. 3, the compartment 38 of the half-shell 24 extends adjacent, and interior to, the end portion of the case 12 that includes the shoulder 16. As a result, when the case 12 is in the closed configuration, the compartment 38 is contiguous with at least part of the compartment 32 of the half-shell 22. Moreover, the compartment 38 extends adjacent the divider wall 40 and opposite the compartment 36.

Walls 80 and 82 also extend within the compartment 38. The walls 80 and 82 each extend from the divider wall 40. In some embodiments, the walls 80 and 82 are spaced in a substantially parallel relation. In some embodiments, the walls 80 and 82 are each spaced a substantially perpendicular relation with the divider wall 40. In addition, extending from the wall 80, in a direction opposite the wall 82, are walls 84 and 86. In some embodiments, the walls 84 and 86 are spaced in a substantially parallel relation. In some embodiments, the walls 84 and 86 are each spaced in a substantially perpendicular relation with the wall 80. The wall 84 includes a step 88. The step 88 forms a bottom edge 90 and a side edge 92 in the wall 84. The wall 86 also includes a step 94. The step 94 forms a bottom edge 96 and a side edge 98 in the wall 86. Similarly, extending from the wall 82, in a direction opposite the wall 80, are walls 100 and 102. In some embodiments, the walls 100 and 102 are spaced in a substantially parallel relation. In some embodiments, the walls 100 and 102 are each spaced in a substantially perpendicular relation with the wall 82. The wall 100 includes a step 104. The step 104 forms a bottom edge 106 and a side edge 108 in the wall 100. The wall 102 also includes a step 110. The step 110 forms a bottom edge 112 and a side edge 114 in the wall 102.

A textual designation 116 is molded into the interior of the half-shell 24. The textual designation 116 extends adjacent, and between, the wall 80 and the wall 82. In some embodiments, the textual designation 116 reads "DENTAL FLOSS."

In some embodiments, the walls 84 and 100 are substantially co-planar. In some embodiments, the walls 86 and 102 are substantially co-planar. Moreover, in some embodiments, when the case 12 is in the closed configuration, the walls 86 and 102 are both substantially co-planar with the end wall 62.

Figure 12:
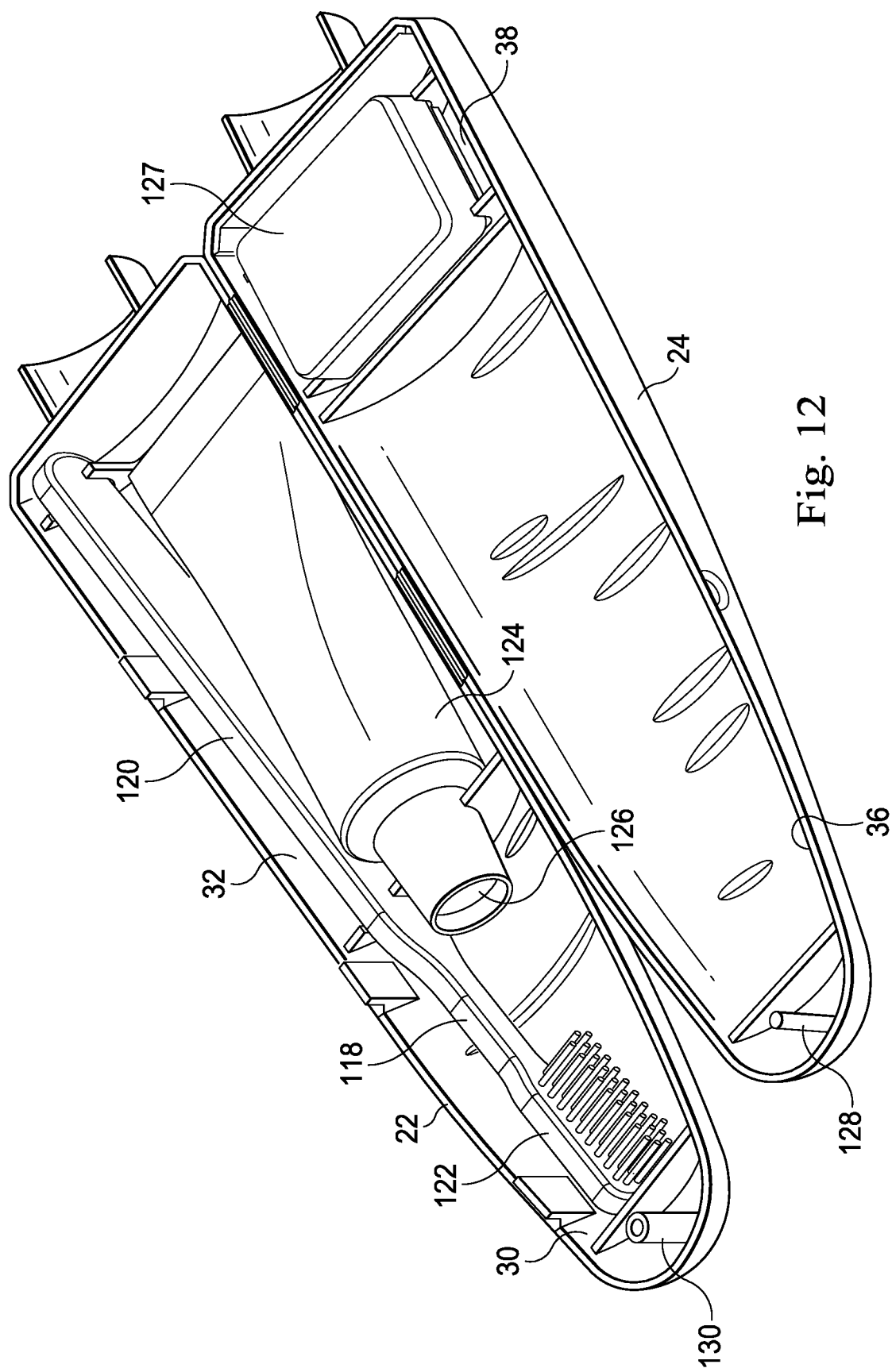
FIG. 12 is a perspective view of the case of FIGS. 3 and 8-11 accommodating a toothbrush, a toothpaste container, and a floss container, according to an embodiment.

In an embodiment, as illustrated in FIG. 12, the half-shell 22 accommodates a toothbrush 118. A handle 120 of the toothbrush 118 extends within the notch 54 and adjacent both the bottom edge 66 and the side edge 68. As a result, a head 122 of the toothbrush 118 extends within the compartment 30. Further, in some embodiments, the half-shell 22 also accommodates a container 124 containing, for example, toothpaste. A cap 126 of the container 124 extends within the notch 54. As a result, an end portion of the container 124 opposing the cap 126 extends adjacent the bottom edge 66. Finally, in some embodiments, the half-shell 24 accommodates a floss container 127 containing, for example, floss. The floss container 127 is at least partially surrounded by the divider wall 40 and the walls 80, 82, 84, 86, 100, and 102. As a result, the floss container 127 is engaged by one or more of: the bottom edges 90, 96, 106, and 112, and the side edges 92, 98, 108, and 114.

Referring still to FIG. 12, in some embodiments, the case 12 further includes a male connector 128 in the compartment 36, and a female connector 130 in the compartment 30. The male and female connectors 128 and 130 extend adjacent the tip 18 of the case 12 so that, when the case 12 is in the closed configuration, the male connector 128 engages the female connector 130 to hold the case 12 in the closed configuration. In some embodiments, the male connector 128 is omitted and replaced with a female connector substantially identical to the female connector 130. In some embodiments, the female connector 130 is omitted and replaced with a male connector substantially identical to the male connector 128. In some embodiments, the male connector 128 is omitted and replaced with a female connector substantially identical to the female connector 130, and the female connector 130 is omitted and replaced with a male connector substantially identical to the male connector 128. In other embodiments, the male connector 128 and the female connector 130 are omitted.

Referring to FIG. 13, in some embodiments, the case 12 is omitted from the dental hygiene device 10 and replaced with a case 132—the case 132 includes several features/elements that are substantially identical to corresponding features/elements of the case 12, which substantially identical features/elements are given the same reference numerals. However, the case 132 includes some features/elements that are different from the features/elements of the case 12 discussed herein.

For example, in the case 132, the instructional label 60 is omitted from the compartment 30, and the reflective strip 70 is omitted from the compartment 32 and replaced with an instructional label 134 that is substantially identical to the instructional label 60. That is, the instructional label 134 is adhered to the half-shell 22 between the end wall 62 and the divider wall 34.

For another example, in addition to the step 64 forming the bottom edge 66 and the side edge 68 in the end wall 62, the end wall 62 includes a prong 136 extending from the bottom edge 66 and spaced apart from the side edge 68. In some embodiments, the prong 136 is configured to retain the toothbrush 118 adjacent the side edge 68 of the end wall 62.

For yet another example, the case 132 includes a reflective surface 138 extending adjacent, and between, the wall 80 and the wall 82. In some embodiments, the reflective surface 138 is defined by a solid-faced mirror. In some embodiments, the reflective surface 138 is made of stainless steel. However, the reflective surface 138 can be made of any suitable material such as, for example Mylar. In some embodiments, the reflective surface 138 is about 1⅜" in length. In some embodiments, the reflective surface 138 is about 1" in width. In some embodiments, the reflective surface 138 is about 1⅜" in length and about 1" in width.

For yet another example, rather than being located between the wall 80 and the wall 82, the textual designation 116 is omitted and replaced with a textual designation 140 substantially identical to the textual designation 116 and molded into the interior of the half-shell 24 on a side of the wall 82 opposite the wall 80. In addition, or instead, the textual designation 116 may be molded into the interior of the half-shell 24 on a side of the wall 80 opposite the wall 82.

In operation, the half-shell 22 of the case 132 is configured to accommodate the toothbrush 118 in a manner similar to the manner in which the case 12 accommodates the toothbrush 118, except that the prong 136 is configured to retain the toothbrush 118 adjacent the side edge 68 of the end wall 62. Further, the half-shell 22 of the case 132 is also configured to accommodate the container 124 (containing, for example, toothpaste) in a manner similar to the manner in which the case 12 accommodates the container 124. Finally, the half-shell 24 of the case 132 is configured to accommodate the floss container 127 (containing, for example, floss) in a manner similar to the manner in which the case 12 accommodates the container 127.

The present disclosure introduces a dental hygiene device, including a case including opposing first and second half-shells hingedly coupled to one another and being actuable between an open configuration and a closed configuration; and a closure configured to engage the case when the case is in the closed configuration to thereby secure the case in the closed configuration, wherein the first half-shell is divided into first and second compartments by a first divider wall, wherein the second half-shell is divided into third and fourth compartments by a second divider wall, and wherein, when the case is in the closed configuration, the first compartment is contiguous with at least part of the third compartment, and the second compartment is contiguous with at least part of the third compartment and the fourth compartment. In some embodiments, the first divider wall includes first and second notches formed therein and configured to accommodate a toothbrush and a toothpaste container, respectively. In some embodiments, the fourth compartment includes first and second walls each extending from the divider wall. In some embodiments, a reflective surface extends adjacent, and between, the first and second walls. In some embodiments, the fourth compartment further includes third, fourth, fifth, and sixth walls, the third and fourth walls extending from the first wall, the fifth and sixth walls extending from the second wall, and the third, fourth, fifth, and sixth walls each include a side edge formed therein. In some embodiments, a floss container is configured to be accommodated between the respective side edges of the third, fourth, fifth, and sixth walls. In some embodiments, the closure is generally cup-shaped and includes a bottom and an outer wall, the outer wall circumscribing the bottom so that the bottom and the outer wall together define an empty space capable of receiving a liquid. In some embodiments, the closure is shaped to resemble the stem of a carrot plant; and the case is shaped to resemble the storage root of the carrot plant.

The present disclosure also introduces a dental hygiene device, including a case including opposing first and second half-shells hingedly coupled to one another and being actuable between an open configuration and a closed configuration; and a closure configured to engage the case when the case is in the closed configuration to thereby secure the case in the closed configuration, wherein the first half-shell is divided into first and second compartments by a first divider wall, and wherein the first divider wall includes first and second notches formed therein and configured to accommodate a toothbrush and a toothpaste container, respectively. In some embodiments, the second half-shell is divided into third and fourth compartments by a second divider wall. In some embodiments, the fourth compartment includes a reflective surface. In some embodiments, the fourth compartment is configured to accommodate a floss container. In some embodiments, the closure is generally cup-shaped and includes a bottom and an outer wall, the outer wall circumscribing the bottom so that the bottom and the outer wall together define an empty space capable of receiving a liquid. In some embodiments, the closure is shaped to resemble the stem of a carrot plant; and the case is shaped to resemble the storage root of the carrot plant.

The present disclosure also introduces a dental hygiene device, including a case including opposing first and second half-shells hingedly coupled to one another and being actuable between an open configuration and a closed configuration; and a closure configured to engage the case when the case is in the closed configuration to thereby secure the case in the closed configuration, wherein the second half-shell is divided into first and second compartments by a divider wall, and wherein the second compartment includes first and second walls each extending from the divider wall. In some embodiments, a reflective surface extends adjacent, and between, the first and second walls. In some embodiments, the second compartment further includes third, fourth, fifth, and sixth walls, the third and fourth walls extending from the first wall, the fifth and sixth walls extending from the second wall, and the third, fourth, fifth, and sixth walls each include a side edge formed therein. In some embodiments, a floss container is configured to be accommodated between the respective side edges of the third, fourth, fifth, and sixth walls. In some embodiments, the closure is generally cup-shaped and includes a bottom and an outer wall, the outer wall circumscribing the bottom so that the bottom and the outer wall together define an empty space capable of receiving a liquid. In some embodiments, the closure is shaped to resemble the stem of a carrot plant; and the case is shaped to resemble the storage root of the carrot plant.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A dental hygiene device, comprising:
   a case including opposing first and second half-shells hingedly coupled to one another and being actuable between an open configuration and a closed configuration,
   wherein the first half-shell defines opposing first and second end portions and a first internal concavity, the first half-shell comprising:
   a first divider wall dividing the first internal concavity into first and second compartments,
   a first tip part located at the first end portion, the first compartment extending between the first tip part and the first divider wall,
   a first end wall located at the second end portion, the second compartment extending between the first end wall and the first divider wall, and
   a first external connection part extending from the first end wall in a first direction opposite the first tip part, and
wherein the second half-shell defines opposing third and fourth end portions and a second internal concavity, the second half-shell comprising:
a second divider wall dividing the second internal concavity into third and fourth compartments,
a second tip part located at the third end portion, the third compartment extending between the second tip part and the second divider wall,
a second end wall located at the fourth end portion, the fourth compartment extending between the second end wall and the second divider wall, and
a second external connection part extending from the second end wall in a second direction opposite the second tip part;
and
a closure including an internal connection configured to engage the first and second external connection parts of the first and second half-shells, respectively, when the case is in the closed configuration to thereby secure the case in the closed configuration,
wherein, when the internal connection engages the first and second external connection parts, the closure blocks the case from being actuated to the open configuration from the closed configuration,
wherein the first and second external connection parts define first and second radially outward facing portions, respectively,
wherein the internal connection of the closure defines a radially inward facing portion configured to engage the first and second radially outward facing portions when the case is in the closed configuration,
wherein the engagement of the radially inward facing portion with the first and second radially outward facing portions blocks the case from being actuated to the open configuration from the closed configuration, and
wherein, when the case is in the closed configuration, the first compartment of the first half-shell is contiguous with at least part of the third compartment of the second half-shell, and the second compartment of the first half-shell is contiguous with at least part of the third compartment of the second half-shell and the fourth compartment of the second half-shell.

2. The dental hygiene device of claim 1, wherein the first divider wall includes first and second notches formed therein and configured to accommodate a toothbrush and a toothpaste container, respectively.

3. The dental hygiene device of claim 1, wherein the fourth compartment includes first and second walls each extending from the second divider wall.

4. The dental hygiene device of claim 3, wherein a reflective surface extends adjacent, and between, the first and second walls.

5. The dental hygiene device of claim 3, wherein the fourth compartment further includes third, fourth, fifth, and sixth walls, the third and fourth walls extending from the first wall, the fifth and sixth walls extending from the second wall, and the third, fourth, fifth, and sixth walls each include a side edge formed therein.

6. The dental hygiene device of claim 5, wherein a floss container is configured to be accommodated between the respective side edges of the third, fourth, fifth, and sixth walls.

7. The dental hygiene device of claim 1, wherein the closure is generally cup-shaped and includes a bottom and an outer wall, the outer wall circumscribing the bottom so that the bottom and the outer wall together define an empty space capable of receiving a liquid.

8. The dental hygiene device of claim 1, wherein the closure is shaped to resemble the stem of a carrot plant; and
wherein the case is shaped to resemble the storage root of the carrot plant.

9. A dental hygiene device, comprising:
a case including opposing first and second half-shells hingedly coupled to one another and being actuable between an open configuration and a closed configuration,
wherein the first half-shell defines opposing first and second end portions and a first internal concavity, the first half-shell comprising:
a first divider wall dividing the first internal concavity into first and second compartments,
first and second notches formed into the first divider wall and configured to accommodate a toothbrush and a toothpaste container, respectively,
a first tip part located at the first end portion, the first compartment extending between the first tip part and the first divider wall,
a first end wall located at the second end portion, the second compartment extending between the first end wall and the first divider wall, and
a first external connection part extending from the first end wall in a first direction opposite the first tip part,
and
wherein the second half-shell defines opposing third and fourth end portions, the second half-shell comprising:
a second tip part located at the third end portion,
a second end wall located at the fourth end portion, and
a second external connection part extending from the second end wall in a second direction opposite the second tip part;
and
a closure including an internal connection configured to engage the first and second external connection parts of the first and second half-shells, respectively, when the case is in the closed configuration to thereby secure the case in the closed configuration,
wherein, when the internal connection engages the first and second external connection parts, the closure blocks the case from being actuated to the open configuration from the closed configuration,
wherein the first and second external connection parts define first and second radially outward facing portions, respectively,
wherein the internal connection of the closure defines a radially inward facing portion configured to engage the first and second radially outward facing portions when the case is in the closed configuration, and
wherein the engagement of the radially inward facing portion with the first and second radially outward facing portions blocks the case from being actuated to the open configuration from the closed configuration.

10. The dental hygiene device of claim 9, wherein the second half-shell further defines a second internal concavity divided into third and fourth compartments by a second divider wall, the third compartment extending between the second tip part and the second divider wall, the fourth compartment extending between the second end wall and the second divider wall.

11. The dental hygiene device of claim 10, wherein the fourth compartment includes a reflective surface.

12. The dental hygiene device of claim 10, wherein the fourth compartment is configured to accommodate a floss container.

13. The dental hygiene device of claim 9, wherein the closure is generally cup-shaped and includes a bottom and an outer wall, the outer wall circumscribing the bottom so that the bottom and the outer wall together define an empty space capable of receiving a liquid.

14. The dental hygiene device of claim 9, wherein the closure is shaped to resemble the stem of a carrot plant; and
wherein the case is shaped to resemble the storage root of the carrot plant.

15. A dental hygiene device, comprising:
a case including opposing first and second half-shells hingedly coupled to one another and being actuable between an open configuration and a closed configuration,
wherein the first half-shell defines opposing first and second end portions, the first half-shell comprising:
a first tip part located at the first end portion,
a first end wall located at the second end portion, and
a first external connection part extending from the first end wall in a first direction opposite the first tip part,
and
wherein the second half-shell defines opposing third and fourth end portions and an internal concavity, the second half-shell comprising:
a divider wall dividing the internal concavity into first and second compartments,
first and second walls each extending from the divider wall,
a second tip part located at the third end portion, the first compartment extending between the second tip part and the divider wall,
a second end wall located at the fourth end portion, the second compartment extending between the second end wall and the divider wall, and
a second external connection part extending from the second end wall in a second direction opposite the second tip part;
and
a closure including an internal connection configured to engage the first and second external connection parts of the first and second half-shells, respectively, when the case is in the closed configuration to thereby secure the case in the closed configuration,
wherein, when the internal connection engages the first and second external connection parts, the closure blocks the case from being actuated to the open configuration from the closed configuration,
wherein the first and second external connection parts define first and second radially outward facing portions, respectively,
wherein the internal connection of the closure defines a radially inward facing portion configured to engage the first and second radially outward facing portions when the case is in the closed configuration, and
wherein the engagement of the radially inward facing portion with the first and second radially outward facing portions blocks the case from being actuated to the open configuration from the closed configuration.

16. The dental hygiene device of claim 15, wherein a reflective surface extends adjacent, and between, the first and second walls.

17. The dental hygiene device of claim 15, wherein the second half-shell further includes third, fourth, fifth, and sixth walls, the third and fourth walls extending from the first wall, the fifth and sixth walls extending from the second wall, and the third, fourth, fifth, and sixth walls each include a side edge formed therein.

18. The dental hygiene device of claim 17, wherein a floss container is configured to be accommodated between the respective side edges of the third, fourth, fifth, and sixth walls.

19. The dental hygiene device of claim 15, wherein the closure is generally cup-shaped and includes a bottom and an outer wall, the outer wall circumscribing the bottom so that the bottom and the outer wall together define an empty space capable of receiving a liquid.

20. The dental hygiene device of claim 15, wherein the closure is shaped to resemble the stem of a carrot plant; and
wherein the case is shaped to resemble the storage root of the carrot plant.

21. A dental hygiene device, comprising:
a case including opposing first and second half-shells hingedly coupled to one another and being actuable between an open configuration and a closed configuration,
wherein the first half-shell defines opposing first and second end portions and a first internal concavity, the first half-shell comprising:
a first tip part located at the first end portion,
a first end wall located at the second end portion, the first internal concavity extending between first end wall and the first tip part, and
a first external connection part extending from the first end wall in a first direction opposite the first tip part,
and
wherein the second half-shell defines opposing third and fourth end portions and a second internal concavity, the second half-shell comprising:
a second tip part located at the third end portion,
a second end wall located at the fourth end portion, the second internal concavity extending between the second end wall and the second tip part, and
a second external connection part extending from the second end wall in a second direction opposite the second tip part;
and
a closure including an internal connection configured to engage the first and second external connection parts of the first and second half-shells, respectively, when the case is in the closed configuration to thereby secure the case in the closed configuration,
wherein, when the internal connection engages the first and second external connection parts, the closure blocks the case from being actuated to the open configuration from the closed configuration,
wherein the first and second external connection parts define first and second radially outward facing portions, respectively,
wherein the internal connection of the closure defines a radially inward facing portion configured to engage the first and second radially outward facing portions when the case is in the closed configuration, and
wherein the engagement of the radially inward facing portion with the first and second radially outward facing portions blocks the case from being actuated to the open configuration from the closed configuration.

22. The dental hygiene device of claim 21, wherein the second half-shell further comprises a divider wall dividing the second internal concavity into first and second compartments, the first compartment extending between the second tip part and the second divider wall, and the second compartment extending between the second end wall and the second divider wall.

23. The dental hygiene device of claim 22, wherein the second compartment includes a reflective surface.

24. The dental hygiene device of claim 22, wherein the second compartment is configured to accommodate a floss container.

25. The dental hygiene device of claim 21, wherein the closure is generally cup-shaped and includes a bottom and an outer wall, the outer wall circumscribing the bottom so that the bottom and the outer wall together define an empty space capable of receiving a liquid.

26. The dental hygiene device of claim 21, wherein the closure is shaped to resemble the stem of a carrot plant; and
wherein the case is shaped to resemble the storage root of the carrot plant.

* * * * *